United States Patent
Yun et al.

(10) Patent No.: US 11,018,824 B2
(45) Date of Patent: *May 25, 2021

(54) OPERATION METHOD OF COMMUNICATION NODE SUPPORTING DIRECT COMMUNICATION IN NETWORK

(71) Applicant: ELECTRONICS AND TELECOMMUNICATIONS RESEARCH INSTITUTE, Daejeon (KR)

(72) Inventors: Mi Young Yun, Daejeon (KR); Ji Hyung Kim, Daejeon (KR); Jae Heung Kim, Daejeon (KR); Jae Sheung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,509

(22) Filed: Mar. 31, 2020

(65) Prior Publication Data

US 2020/0280413 A1 Sep. 3, 2020

Related U.S. Application Data

(63) Continuation of application No. 15/235,996, filed on Aug. 12, 2016, now Pat. No. 10,644,848.

(30) Foreign Application Priority Data

Aug. 13, 2015 (KR) .................. 10-2015-0114679
Aug. 11, 2016 (KR) .................. 10-2016-0102590

(51) Int. Cl.
*H04L 5/00* (2006.01)
*H04W 76/14* (2018.01)

(52) U.S. Cl.
CPC .......... *H04L 5/0048* (2013.01); *H04L 5/0053* (2013.01); *H04L 5/0091* (2013.01); *H04W 76/14* (2018.02)

(58) Field of Classification Search
CPC ..... H04W 76/14; H04W 76/023; H04W 4/70; H04L 5/0091; H04L 5/0053; H04L 5/0048
See application file for complete search history.

(56) References Cited

U.S. PATENT DOCUMENTS

| | | |
|---|---|---|
| 2010/0273488 A1 | 10/2010 | Kim |
| 2011/0076938 A1 | 3/2011 | Eguchi |
| 2013/0258996 A1 | 10/2013 | Jung et al. |
| 2014/0044024 A1 | 2/2014 | Zou et al. |
| 2015/0270939 A1 | 9/2015 | Ro et al. |
| 2015/0271657 A1 | 9/2015 | Xiong et al. |

(Continued)

FOREIGN PATENT DOCUMENTS

WO 2015/025453 A1 2/2015

*Primary Examiner* — Pao Sinkantarakorn
*Assistant Examiner* — Kabir U Jahangir
(74) *Attorney, Agent, or Firm* — Rabin & Berdo, P.C.

(57) ABSTRACT

Disclosed are operation methods of communication node supporting direct communications in network. The operation method may comprise generating control information which includes parameters used for transmitting and receiving data; transmitting, to a second UE, the control information through a physical sidelink control channel (PSCCH); and transmitting, to the second UE, the data through a physical sidelink shared channel (PSSCH) based on the parameters. Therefore, a performance of the network can be enhanced.

9 Claims, 5 Drawing Sheets

(56) References Cited

U.S. PATENT DOCUMENTS

| | | |
|---|---|---|
| 2015/0271800 A1 | 9/2015 | Panteleev et al. |
| 2015/0282203 A1 | 10/2015 | Liu et al. |
| 2016/0014812 A1 | 1/2016 | Park et al. |
| 2016/0037488 A1 | 2/2016 | Li et al. |
| 2016/0044653 A1 | 2/2016 | Bagheri et al. |
| 2016/0044666 A1 | 2/2016 | Shin et al. |
| 2016/0135240 A1 | 5/2016 | Yoon |
| 2016/0205665 A1 | 7/2016 | Fukuta et al. |
| 2016/0338055 A1 | 11/2016 | Yang et al. |
| 2016/0338095 A1 | 11/2016 | Faurie et al. |
| 2016/0381670 A1 | 12/2016 | Kim et al. |
| 2017/0019886 A1 | 1/2017 | Patel et al. |
| 2017/0055280 A1 | 2/2017 | Kim et al. |
| 2017/0164381 A1 | 6/2017 | Kim et al. |

OPERATION METHOD OF COMMUNICATION NODE SUPPORTING DIRECT COMMUNICATION IN NETWORK

CROSS-REFERENCE TO RELATED APPLICATIONS

The present application is a Continuation Application of co-pending U.S. application Ser. No. 15/235,996, filed on Aug. 12, 2016, and claims the benefit of and priority to Korean Patent Application No. 10-2015-0114679 filed on Aug. 13, 2015 and Korean Patent Application No. 10-2016-0102590 filed on Aug. 11, 2016 in the Korean Intellectual Property Office (KIPO), the entire contents of which are hereby incorporated by reference.

BACKGROUND

1. Technical Field

The present disclosure relates to wireless communication technologies, and more particularly, to technologies for transmitting and receiving control information and data based on direct communications.

2. Related Art

In a cellular communication network, a user equipment (UE) may generally transmit or receive data through a base station. For example, in the case that data which will be transmitted to a second UE exists, a first UE may generate a message including the data which will be transmitted to the second UE and transmit the generated message to a first base station to which the first UE belongs. The first base station may receive the message from the first UE and identify that destination of the received message is the second UE. The first base station may transmit the message to a second base station to which the second UE, as the identified destination, belongs. The second base station may receive the message from the first base station and identify that destination of the received message is the second UE. The second base station may transmit the message to the second UE as the identified destination. The second UE may receive the message from the second base station and obtain the data included in the received message.

Meanwhile, device to device (D2D) communications may indicate that a UE directly communicates with other UE. In the case that the D2D communications between the first UE and the second UE is performed, the first UE may transmit control information to the second UE through a physical sidelink control channel (PSCCH) and transmit data to the second UE through a physical sidelink shared channel (PSSCH) indicated by the control information. Therefore, the second UE may identify the PSSCH, through which the data will be transmitted, based on the control information which is received through the PSCCH and receive the data through the identified PSSCH.

However, in the case that decoding of the control information is not completed at a reception time of the data, the second UE may not receive the data because resource (i.e., PSSCH) through which the data is transmitted is not identified. Alternatively, in the case that resource through which the data is transmitted is not identified, the second UE should identify total resources so as to receive the data.

Meanwhile, this description on the related arts is written for understanding of the background of the present disclosure. Thus, information on other than conventional technologies, which are already known to those skilled in this technology domain to which the technologies of the present disclosure belong, may be included in this description.

SUMMARY

The objects of the present disclosure for resolving the foregoing problems provide a method for transmitting and receiving efficiently control information and data based on direct communications and an apparatus for the same.

In accordance with the embodiments of the present disclosure, an operation method of a first user equipment (UE) supporting direct communications may be provided. The operation method comprises generating control information which includes parameters used for transmitting and receiving data; transmitting, to a second UE, the control information through a physical sidelink control channel (PSCCH); and transmitting, to the second UE, the data through a physical sidelink shared channel (PSSCH) based on the parameters, wherein the control information and the data are repeatedly transmitted by the first UE, and an transmission interval between last control information among the repeated control information and initial data among the repeated data is configured to be equal to or more than a time duration necessary for decoding the last control information in the second UE.

Here, the operation method may further comprise receiving the parameters from a base station, wherein the first UE belongs to cell coverage of the base station.

Here, the parameters may be received from the base station through a system information block (SIB) type 18.

Here, the parameters may be received from the base station through a downlink control information (DCI) format 5.

Here, the control information may be transmitted to the second UE through a sidelink control information (SCI) format 0.

Here, the control information may include a parameter indicating a number of repeated transmissions of the data.

Here, the parameter indicating the number of repeated transmissions of the data may be indicated by a reserved bit among bits which are configured for a time resource pattern parameter among the parameters included in the control information.

Here, the control information may include a parameter indicating a redundancy version of the data.

Here, the control information may include a parameter indicating a transmission pattern of a reference signal.

Here, the operation method may further comprise transmitting the reference signal based on the parameter indicating the transmission pattern of the reference signal.

Furthermore, in accordance with the embodiments of the present disclosure, an operation method of a first user equipment (UE) supporting direct communications may be provided. The operation method comprises receiving, from a second UE, control information which includes parameters used for transmitting and receiving data through a physical sidelink control channel (PSCCH); decoding the control information; and receiving, from the second UE, the data through a physical sidelink shared channel (PSSCH) based on a result of the decoding, wherein the control information and the data are repeatedly transmitted from the second UE, and a reception interval between last control information among the repeated control information and initial data among the repeated data is configured to be equal to or more than a time duration necessary for decoding the last control information in the first UE.

Here, the control information may be received from the second UE through a sidelink control information (SCI) format 0.

Here, the control information may include a parameter indicating a number of repeated transmissions of the data.

Here, the parameter indicating the number of repeated transmissions of the data may be indicated by a reserved bit among bits which are configured for a time resource pattern parameter among the parameters included in the control information.

Here, the control information may include a parameter indicating a redundancy version of the data.

Here, the control information may include a parameter indicating a transmission pattern of a reference signal.

Furthermore, in accordance with the embodiments of the present disclosure, a first user equipment (UE) supporting direct communications may be provided. The first UE comprises a processor; and a memory storing at least one command which is executed by the processor, wherein the at least one command is executed to generate control information which includes parameters used for transmitting and receiving data; transmit, to a second UE, the control information through a physical sidelink control channel (PSCCH); and transmit, to the second UE, the data through a physical sidelink shared channel (PSSCH) based on the parameters, wherein the control information and the data are repeatedly transmitted by the first UE, and an transmission interval between last control information among the repeated control information and initial data among the repeated data is configured to be equal to or more than a time duration necessary for decoding the last control information in the second UE.

Here, the control information may include a parameter indicating a number of repeated transmissions of the data.

Here, the control information may include a parameter indicating a redundancy version of the data.

Here, the control information may include a parameter indicating a transmission pattern of a reference signal.

According to the embodiments of the present disclosure, the interval between a transmission (or, reception) time of the last control information in a PSCCH period and a transmission (or, reception) time of the initial data in a PSSCH period can be configured to be equal to or more than a time duration necessary for decoding the last control information. Therefore, a receiving UE supporting device to device (D2D) communications (or, vehicle communications) can complete decoding of the control information prior to the reception time of the initial data, identify resource through which the initial data is transmitted, and receive the initial data through the identified resource.

In addition, a transmitting UE supporting the D2D communications (or, vehicle communications) can inform the receiving UE of information on the number of repeated transmissions of the data and repeatedly transmit the data to the receiving UE as much as the number of repeated transmissions indicated by the information. The receiving UE can identify the number of repeated transmissions of the data based on the obtained information and receive the data based on the number of repeated transmissions. The number of repeated transmissions of data can be configured differently based on requirement of respective services, network environment (e.g., cell power, transmit power, etc.), environment of area in which the transmitting UE and the receiving UE are located, movement speed (or, average movement speed) of the transmitting UE and the receiving UE, recovery rate of data, density of UE, and so on.

Therefore, the data can be transmitted and received efficiently by configuring adaptively the number of repeated transmissions of the data.

In addition, the transmitting UE can inform the receiving UE of transmission pattern information of a reference signal and transmit the reference signal to the receiving UE based on the transmission pattern information. The receiving UE can identify resource through which the reference signal is transmitted based on the transmission pattern information and receive the reference signal based on the identified resource. The transmission pattern of the reference signal can be various according to the requirement of respective services, the network environment, the environment of area in which the transmitting UE and the receiving UE are located, the movement speed (or, average movement speed) of the transmitting UE and the receiving UE, the recovery rate of data, the density of UE, and so on. Therefore, the D2D communications (or, vehicle communications) can be performed efficiently by configuring adaptively the transmission pattern of the reference signal.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION OF THE EMBODIMENTS

The present disclosure may be modified in various ways and the present disclosure may include various embodiments. The embodiments will be shown in figures and described in detail. However, the present disclosure is not limited to specific embodiments. It should be understood that the present disclosure includes all modifications, similar embodiments, and alternative embodiments belonging to idea and technical scope thereof.

The terms "first, second, and so on" will be used for describing various elements. However, the elements are not limited thereto. These terms are only used to distinguish one element from another. For example, a first element could be termed a second element, and, similarly, the second element could be termed the first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, in the case that an element is referred to as being "directly connected" or "directly coupled" to another element, it will be understood that there are no intervening elements.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A wireless communication network to which embodiments according to the present disclosure are applied will be described. The wireless communication network to which the embodiments according to the present disclosure are applied is not limited to description below, and the embodiments according to the present disclosure may be applied to various wireless communication networks. The wireless communication network may indicate a wireless communication system.

Figure 1:
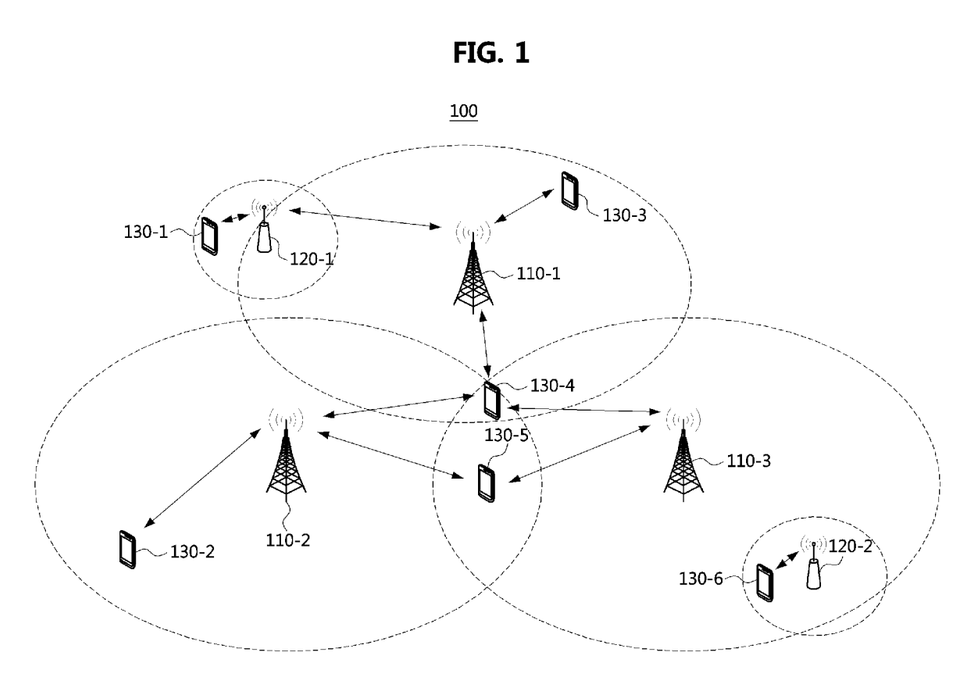
FIG. 1 is a conceptual diagram showing embodiments of a wireless communication system.

FIG. 1 is a conceptual diagram showing embodiments of a wireless communication network.

As shown in FIG. 1, a wireless communication network 100 may include a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier-frequency division multiple access (SC-FDMA) based communication protocol, a non-orthogonal multiple access (NOMA) based communication protocol, a space division multiple access (SDMA) based communication protocol, a radio access technology (RAT) based communication protocol supporting multiple access based on a beamforming technology by massive antenna, and so on. Each of the plurality of communication nodes may have following structure.

Figure 2:
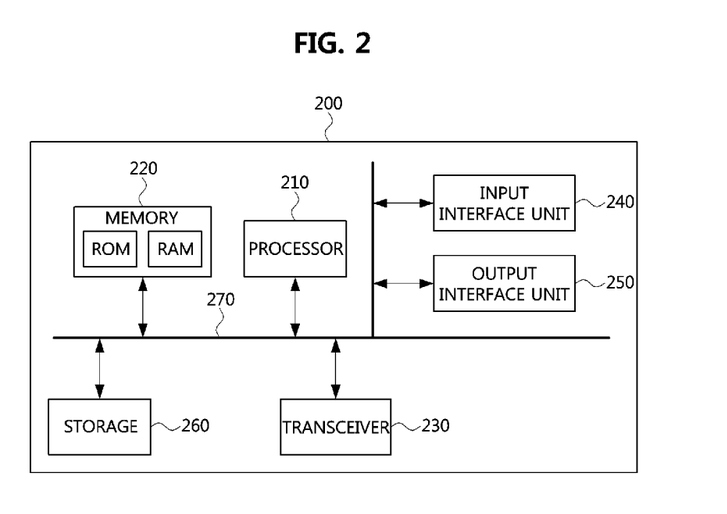
FIG. 2 is a block diagram showing embodiments of a communication node in a wireless communication system.

FIG. 2 is a block diagram showing embodiments of a communication node in a wireless communication network.

As shown in FIG. 2, a communication node 200 may include at least one processor 210, a memory 220, and a transceiver 230 connected to a network and performing communication. In addition, the communication node 200 may further include an input interface unit 240, an output interface unit 250, a storage 260, and so on. The respective components included in the communication node 200 may be connected via a bus 270 to communicate with each other.

The processor 210 may execute a program command stored in the memory 220 and/or the storage 260. The processor 210 may be a central processing unit (CPU), a graphics processing unit (GPU) or a dedicated processor in which the methods according to embodiments of the present disclosure are performed. Each of the memory 220 and the storage 260 may include a volatile storage medium and/or a nonvolatile storage medium. For example, the memory 220 may include a read only memory (ROM) and/or a random access memory (RAM).

As re-shown FIG. 1, the wireless communication network 100 may include a plurality of base stations 110-1, 110-2, 110-3, 120-1, and 120-2 and a plurality of user equipment (UEs) 130-1, 130-2, 130-3, 130-4, 130-5, and 130-6. Each of a first base station 110-1, a second base station 110-2, and a third base station 110-3 may form a macro cell. Each of a fourth base station 120-1 and a fifth base station 120-2 may form a small cell. The fourth base station 120-1, a third UE 130-3, and a fourth UE 130-4 may belong to cell coverage of the first base station 110-1. A second UE 130-2, the fourth UE 130-4, and a fifth UE 130-5 may belong to cell coverage of the second base station 110-2. The fifth base station 120-2, the fourth UE 130-4, the fifth UE 130-5, and a sixth UE 130-6 may belong to cell coverage of the third base station 110-3. The first UE 130-1 may belong to cell coverage of the fourth base station 120-1. The sixth UE 130-6 may belong to cell coverage of the fifth base station 120-2.

Each of the plurality of base stations 110-1, 110-2, 110-3, 120-1, and 120-2 may be referred to as a NodeB, an evolved NodeB, a base transceiver station (BTS), a radio base station, a radio transceiver, an access point, an access node, a road side unit (RSU), a radio remote head (RRH), a transmission point (TP), a transmission and reception point (TRP), a relay node, and so on. Each of the plurality of UEs 130-1, 130-2, 130-3, 130-4, 130-5, and 130-6 may be referred to as a terminal, an access terminal, a mobile terminal, a station, a subscriber station, a mobile station, a portable subscriber station, a node, a device, and so on. Alternatively, each of the plurality of UEs 130-1, 130-2, 130-3, 130-4, 130-5, and 130-6 may be a vehicle or a communication node include in the vehicle.

Each of the plurality of communication nodes 110-1, 110-2, 110-3, 120-1, 120-2, 130-1, 130-2, 130-3, 130-4, 130-5, and 130-6 may support long term evolution (LTE) (or, long term evolution-advanced (LTE-A)) defined in a cellular communication standard (e.g., 3rd generation partnership project (3GPP) standard). Each of the plurality of base stations 110-1, 110-2, 110-3, 120-1, and 120-2 may operate in different frequency band or same frequency band. Each of the plurality of base stations 110-1, 110-2, 110-3, 120-1, and 120-2 may be connected to each other through an ideal backhaul or a non-ideal backhaul and exchange information each other through the ideal backhaul or the non-ideal backhaul. Each of the plurality of base stations 110-1, 110-2, 110-3, 120-1, and 120-2 may be connected to a core network (non-shown) through the ideal backhaul or the non-ideal backhaul. Each of the plurality of base stations 110-1, 110-2, 110-3, 120-1, and 120-2 may transmit a signal, which is received from the core network, to corresponding UE 130-1, 130-2, 130-3, 130-4, 130-5, and 130-6 and transmit a signal, which is received from the corresponding UE 130-1, 130-2, 130-3, 130-4, 130-5, and 130-6, to the core network.

Each of the plurality of base stations 110-1, 110-2, 110-3, 120-1, and 120-2 may support downlink transmission based on OFDMA and uplink transmission based on SC-FDMA. In addition, each of the plurality of base stations 110-1, 110-2, 110-3, 120-1, and 120-2 may support multiple input multiple output (MIMO) transmission (e.g., single user-multiple input multiple output (SU-MIMO), multi user-multiple input multiple output (MU-MIMO), massive MIMO, etc.), coordinated multipoint (CoMP) transmission, carrier aggregation (CA) transmission, transmission in an unlicensed band, device to device (D2D) communications (or, proximity service (ProSe)), and so on. Here, each of the plurality of UEs 130-1, 130-2, 130-3, 130-4, 130-5, and 130-6 may perform operations corresponding to or supported by the base station 110-1, 110-2, 110-3, 120-1, and 120-2.

For example, the second base station 110-2 may transmit a signal to the fourth UE 130-4 based on a SU-MIMO manner, and the fourth UE 130-4 may receive the signal from the second base station 110-2 based on the SU-MIMO manner. Alternatively, the second base station 110-2 may transmit a signal to the fourth UE 130-4 and the fifth UE 130-5 based on a MU-MIMO manner, and each of the fourth UE 130-4 and the fifth UE 130-5 may receive the signal from the second base station 110-2 based on the MU-MIMO manner. Each of the first base station 110-1, the second base station 110-2, and the third base station 110-3 may transmit a signal to the fourth UE 130-4 based on a CoMP manner, and the fourth UE 130-4 may receive the signal from the first base station 110-1, the second base station 110-2, and the third base station 110-3 based on the CoMP manner. Each of the plurality of the base stations 110-1, 110-2, 110-3, 120-1, and 120-2 may transmit or receive a signal to or from the UE 130-1, 130-2, 130-3, 130-4, 130-5, and 130-6 belonging to the cell coverage of it based on a CA manner. Each of the first base station 110-1, the second base station 110-2, and the third base station 110-3 may coordinate the D2D communications between the fourth UE 130-4 and the fifth UE 130-5, and each of the fourth UE 130-4 and the fifth UE 130-5 may perform the D2D communications by coordination of each of the first base station 110-1, the second base station 110-2, and the third base station 110-3.

Next, operation methods of the communication node in the wireless communication network will be described. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

In addition, the D2D communication method which will be described below may be applied to vehicle communications. The vehicle communications may be vehicle to everything (V2X) communications. The V2X communications may include vehicle to vehicle (V2V) communications, vehicle to infrastructure (V2I) communications, vehicle to pedestrian (V2P) communications, in-vehicle networking (IVN) communications, and so on. Therefore, the base station may be the access point, the RRH, the RSU, the TRP, the relay, and so on. The UE may be a UE (e.g., on board unit (OBU)) installed to a transport equipment (e.g., a vehicle, a train, a drone, a bicycle, etc.), a UE owned by a user of the transport equipment, a UE owned by a pedestrian, and so on.

In addition, in the D2D communications and the vehicle communications, a control channel used for transmitting and receiving control information may be referred to as a physical sidelink control channel (PSCCH). In the D2D communications and the vehicle communications, a data channel used for transmitting and receiving data may be referred to as a physical sidelink shared channel (PSSCH). The present disclosure will be described based on channels based on the LTE-A system and may be applied to physical layer channels for direct communications in a multiple access system based on a beamforming technology using a plurality of antennas in a frequency band with microwave or millimeter wave.

The D2D communications (or, vehicle communications) may be performed in two modes. The D2D communications (or, vehicle communications) based on a mode 1 may be performed based on resources scheduled by the base station. The D2D communications (or, vehicle communications) based on a mode 2 may be performed based resources which are configured by UE participating the D2D communications (or, vehicle communications). The D2D communications (or, vehicle communications) based on a mode 1 may be performed as follows.

Figure 3:
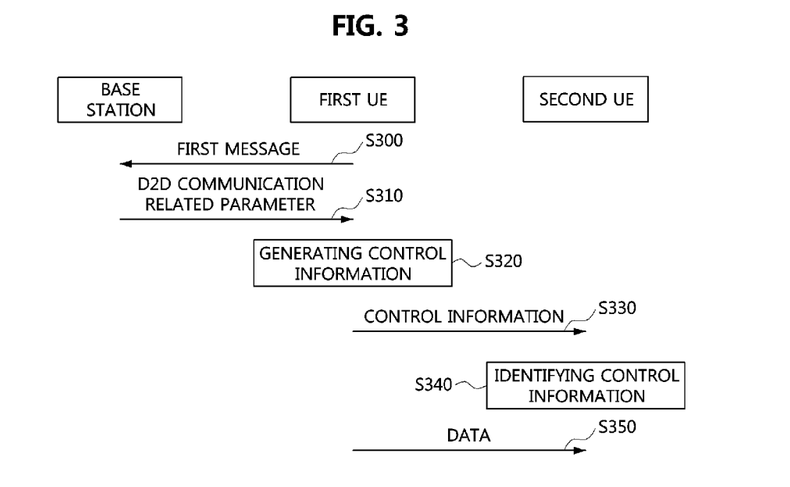
FIG. 3 is a sequence chart showing a D2D communication method (or, vehicle communication method) based on a mode 1.

FIG. 3 is a sequence chart showing a D2D communication method (or, vehicle communication method) based on a mode 1.

As shown in FIG. 3, a first UE may be located in cell coverage of a base station, and a second UE may be located in or out of the cell coverage of the base station. The base station may be the access point, the RRH, the RSU, the TRP, the relay, and so on. The first UE may be a transmitting UE which transmits data in the D2D communications (or, vehicle communications), and the second UE may be a receiving UE which receives data in the D2D communications (or, vehicle communications). Each of the base station, the first UE, and the second UE may have elements identical or similar to the communication node 200 shown in FIG. 2.

In the case that the first UE wishes to transmit data based on the D2D communications (or, vehicle communications), the first UE may transmit a first message requesting allocation of resources for the D2D communications (or, vehicle communications) to the base station (S300). The first message may include information indicating a size of data which will be transmitted based on the D2D communications (or, vehicle communications). The base station may receive the first message from the first UE and configure D2D communication related parameters (or, vehicle communication related parameters) based on the first message. The D2D communication related parameters (or, vehicle communication related parameters) may be Table 1 below.

TABLE 1

| PARAMETER | LENGTH | COMMENT |
|---|---|---|
| Resource for PSCCH | 6 bits | Information of resource used for transmitting SCI format 0 in PSCCH pool. |
| TPC command for PSCCH and PSSCH | 1 bit | In the case that corresponding bit is not set, it is allowed that D2D signal is transmitted in maximum power. In the case that corresponding bit is set, it is required that D2D signal is transmitted according to power control rule. |
| Frequency hopping flag | 1 bit | Indicating whether frequency hopping is applied. |
| $N_{UL\_hop}$ | 1 bit (1.4 MHz), 1 bit (3 MHz), 1 bit (5 MHz), 2 bits (10 MHz), 2 bits (15 MHz), 2 bits (20 MHz) | Indicating the number of uplink hops. |
| Hopping resource allocation | 5 bits (1.4 MHz), 7 bits (3 MHz), 7 bits (5 MHz), 11 bits (10 MHz), 12 bits (15 MHz), 13 bits (20 MHz) | Resource information (frequency domain) of PSSCH. |
| Resource block allocation | | Resource information (frequency domain) of PSSCH. |
| Time resource pattern | 7 bits | Resource information (time domain) of PSSCH. |
| Number of repeated transmissions | | Indicating the number of repeated transmissions of data. |
| Redundancy version | | Indicating redundancy version of data which is repeatedly transmitted. |
| Reference signal pattern | | Indicating transmission pattern of reference signal. |

In the case that the base station configures the resource parameter for PSCCH and the time resource pattern parameter among the parameters described in Table 1, the base station may consider an interval between a transmission (or, reception) time of last control information in a PSCCH period and a transmission (or, reception) time of initial data in a PSSCH period. A method for configuring the resource parameter for PSCCH and the time resource pattern parameter in consideration of the interval between the transmission (or, reception) time of the last control information and the transmission (or, reception) time of the initial data will be described referring to FIG. 4.

Figure 4:
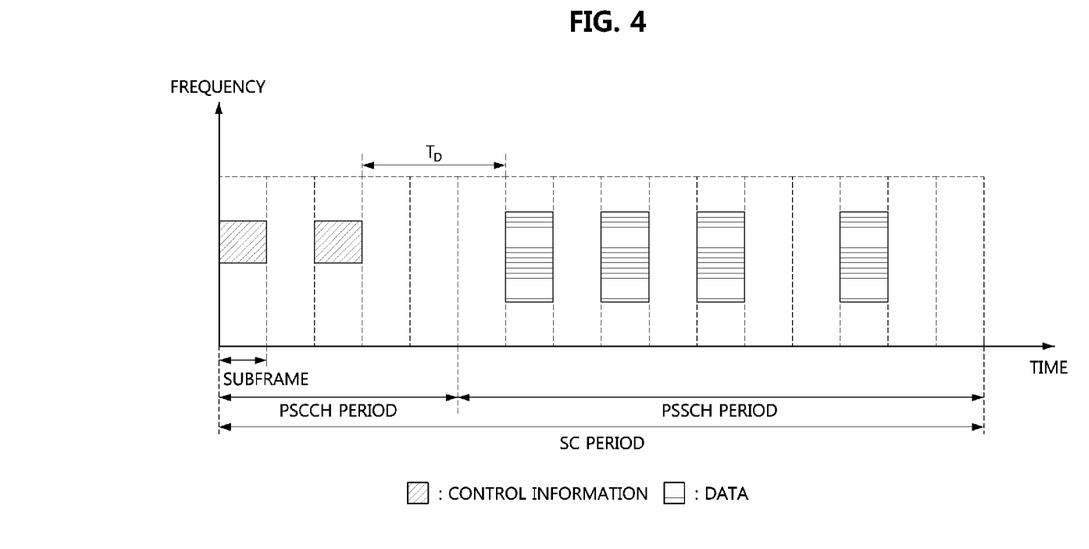
FIG. 4 is a timing diagram showing embodiments for transmitting control information and data in D2D communications (or, vehicle communications)

FIG. 4 is a timing diagram showing embodiments for transmitting control information and data in D2D communications (or, vehicle communications).

As shown in FIG. 4, a sidelink control (SC) period may include a PSCCH period and a PSSCH period. Alternatively, the SC period may include only the PSSCH period. The SC period may be repeated in a period which is configured for the D2D communications. PSCCH may be configured in the PSCCH period, and control information including parameters described in Table 11 to be described may be transmitted through PSCCH. The control information may be transmitted through two subframes. For example, the control information may be repeatedly transmitted in two times. The control information may indicate resource (e.g., location of subframe and resource block) through which data is transmitted. PSSCH may be configured in the PSSCH period, and the data may be transmitted through PSSCH. The data may be transmitted through four subframes. For example, the data may be repeatedly transmitted in four times. The data may have different redundancy version.

A receiving UE (i.e., UE which receives the data in the D2D communications (or, vehicle communications)) may identify resource through which the data is transmitted by decoding the control information received through PSCCH and receive the data through the identified resource. In a viewpoint of the receiving UE, the decoding of the control information should be completed prior to reception of the data so as to receive the data. Here, a time between a reception (or, transmission) end time of the last control information in the PSCCH period and a reception (or, transmission) start time of the initial data (e.g., initial data related to the last control information) may be referred to as $T_D$. A time duration necessary for identifying resource through which the initial data is transmitted by decoding the last control information may be referred to as $T_C$.

Therefore, the base station may configure the resource parameter for PSCCH and the time resource pattern parameter so that $T_D$ is equal to or more than $T_C$. A relation between $T_D$ and $T_C$ may be Equation 1 below. $T_D$ may be set to 1 or 2 transmission time interval (TTI).

$$T_D \geq T_C \quad \text{[Equation 1]}$$

As re-shown in FIG. 3, the parameter on the number of repeated transmissions among the parameters described in Table 1 may indicate the number of repeated transmissions of data. In the case that the number of repeated transmissions is $N_R$, the parameter on the number of repeated transmissions may be represented to as $\log_2(N_R)$. Alternatively, the parameter on the number of repeated transmissions may be represented to bit form. For example, in the case that maximum value of the number of repeated transmissions is 8, the parameter on the number of repeated transmissions may be represented as Table 2 below.

TABLE 2

| NUMBER OF REPEATED TRANSMISSIONS | BITS |
|---|---|
| 1 | 000 |
| 2 | 001 |
| 3 | 010 |
| 4 | 011 |
| 5 | 100 |
| 6 | 101 |
| 7 | 110 |
| 8 | 111 |

Alternatively, the number of repeated transmissions may be indicated by the time resource pattern parameter instead of the parameter on the number of repeated transmissions. For example, in the case that the time resource pattern is preconfigured in UEs (e.g., first UE, second UE) participating the D2D communications (or, vehicle communications), the time resource pattern parameter may indicate the number of repeated transmissions instead of the time resource pattern. In this case, the base station may not configure the parameter on the number of repeated transmissions.

Tables 3 to 5 below may be the time resource pattern parameter which is represented as 8 bits.

TABLE 3

| $I_{TRP}$ | $k_{TRP}$ | $(b_0', b_1', \ldots b'_{N_{TRP}-1})$ |
|---|---|---|
| 0 | 1 | (1, 0, 0, 0, 0, 0, 0, 0) |
| 1 | 1 | (0, 1, 0, 0, 0, 0, 0, 0) |
| 2 | 1 | (0, 0, 1, 0, 0, 0, 0, 0) |
| 3 | 1 | (0, 0, 0, 1, 0, 0, 0, 0) |
| 4 | 1 | (0, 0, 0, 0, 1, 0, 0, 0) |
| 5 | 1 | (0, 0, 0, 0, 0, 1, 0, 0) |
| 6 | 1 | (0, 0, 0, 0, 0, 0, 1, 0) |
| 7 | 1 | (0, 0, 0, 0, 0, 0, 0, 1) |
| 8 | 2 | (1, 1, 0, 0, 0, 0, 0, 0) |
| 9 | 2 | (1, 0, 1, 0, 0, 0, 0, 0) |
| 10 | 2 | (0, 1, 1, 0, 0, 0, 0, 0) |
| 11 | 2 | (1, 0, 0, 1, 0, 0, 0, 0) |
| 12 | 2 | (0, 1, 0, 1, 0, 0, 0, 0) |
| 13 | 2 | (0, 0, 1, 1, 0, 0, 0, 0) |
| 14 | 2 | (1, 0, 0, 0, 1, 0, 0, 0) |
| 15 | 2 | (0, 1, 0, 0, 1, 0, 0, 0) |
| 16 | 2 | (0, 0, 1, 0, 1, 0, 0, 0) |
| 17 | 2 | (0, 0, 0, 1, 1, 0, 0, 0) |
| 18 | 2 | (1, 0, 0, 0, 0, 1, 0, 0) |
| 19 | 2 | (0, 1, 0, 0, 0, 1, 0, 0) |
| 20 | 2 | (0, 0, 1, 0, 0, 1, 0, 0) |
| 21 | 2 | (0, 0, 0, 1, 0, 1, 0, 0) |
| 22 | 2 | (0, 0, 0, 0, 1, 1, 0, 0) |
| 23 | 2 | (1, 0, 0, 0, 0, 0, 1, 0) |
| 24 | 2 | (0, 1, 0, 0, 0, 0, 1, 0) |
| 25 | 2 | (0, 0, 1, 0, 0, 0, 1, 0) |
| 26 | 2 | (0, 0, 0, 1, 0, 0, 1, 0) |
| 27 | 2 | (0, 0, 0, 0, 1, 0, 1, O) |
| 28 | 2 | (0, 0, 0, 0, 0, 1, 1, 0) |
| 29 | 2 | (1, 0, 0, 0, 0, 0, 0, 1) |
| 30 | 2 | (0, 1, 0, 0, 0, 0, 0, 1) |
| 31 | 2 | (0, 0, 1, 0, 0, 0, 0, 1) |
| 32 | 2 | (0, 0, 0, 1, 0, 0, 0, 1) |
| 33 | 2 | (0, 0, 0, 0, 1, 0, 0, 1) |
| 34 | 2 | (0, 0, 0, 0, 0, 1, 0, 1) |
| 35 | 2 | (0, 0, 0, 0, 0, 0, 1, 1) |
| 36 | 4 | (1, 1, 1, 1, 0, 0, 0, 0) |
| 37 | 4 | (1, 1, 1, 0, 1, 0, 0, 0) |

TABLE 4

| $I_{TRP}$ | $k_{TRP}$ | $(b_0', b_1', \ldots b'_{N_{TRP}-1})$ |
|---|---|---|
| 38 | 4 | (1, 1, 0, 1, 1, 0, 0, 0) |
| 39 | 4 | (1, 0, 1, 1, 1, 0, 0, 0) |
| 40 | 4 | (0, 1, 1, 1, 1, 0, 0, 0) |
| 41 | 4 | (1, 1, 1, 0, 0, 1, 0, 0) |
| 42 | 4 | (1, 1, 0, 1, 0, 1, 0, 0) |
| 43 | 4 | (1, 0, 1, 1, 0, 1, 0, 0) |
| 44 | 4 | (0, 1, 1, 1, 0, 1, 0, 0) |
| 45 | 4 | (1, 1, 0, 0, 1, 1, 0, 0) |
| 46 | 4 | (1, 0, 1, 0, 1, 1, 0, 0) |
| 47 | 4 | (0, 1, 1, 0, 1, 1, 0, 0) |
| 48 | 4 | (1, 0, 0, 1, 1, 1, 0, 0) |
| 49 | 4 | (0, 1, 0, 1, 1, 1, 0, 0) |
| 50 | 4 | (0, 0, 1, 1, 1, 1, 0, 0) |
| 51 | 4 | (1, 1, 1, 0, 0, 0, 1, 0) |
| 52 | 4 | (1, 1, 0, 1, 0, 0, 1, 0) |
| 53 | 4 | (1, 0, 1, 1, 0, 0, 1, 0) |
| 54 | 4 | (0, 1, 1, 1, 0, 0, 1, 0) |
| 55 | 4 | (1, 1, 0, 0, 1, 0, 1, 0) |
| 56 | 4 | (1, 0, 1, 0, 1, 0, 1, 0) |
| 57 | 4 | (0, 1, 1, 0, 1, 0, 1, 0) |
| 58 | 4 | (1, 0, 0, 1, 1, 0, 1, 0) |
| 59 | 4 | (0, 1, 0, 1, 1, 0, 1, 0) |
| 60 | 4 | (0, 0, 1, 1, 1, 0, 1, 0) |
| 61 | 4 | (1, 1, 0, 0, 0, 1, 1, 0) |
| 62 | 4 | (1, 0, 1, 0, 0, 1, 1, 0) |
| 63 | 4 | (0, 1, 1, 0, 0, 1, 1, 0) |
| 64 | 4 | (1, 0, 0, 0, 1, 1, 1, 0) |
| 65 | 4 | (0, 1, 0, 1, 0, 1, 1, 0) |
| 66 | 4 | (0, 0, 1, 1, 0, 1, 1, 0) |
| 67 | 4 | (1, 0, 0, 0, 1, 1, 1, 0) |
| 68 | 4 | (0, 1, 0, 0, 1, 1, 1, 0) |
| 69 | 4 | (0, 0, 1, 0, 1, 1, 1, 0) |
| 70 | 4 | (0, 0, 0, 1, 1, 1, 1, 0) |
| 71 | 4 | (1, 1, 1, 0, 0, 0, 0, 1) |
| 72 | 4 | (1, 1, 0, 1, 0, 0, 0, 1) |
| 73 | 4 | (1, 0, 1, 1, 0, 0, 0, 1) |
| 74 | 4 | (0, 1, 1, 1, 0, 0, 0, 1) |
| 75 | 4 | (1, 1, 0, 0, 1, 0, 0, 1) |

TABLE 5

| $I_{TRP}$ | $k_{TRP}$ | $(b_0', b_1', \ldots b'_{N_{TRP}-1})$ |
|---|---|---|
| 76 | 4 | (1, 0, 1, 0, 1, 0, 0, 1) |
| 77 | 4 | (0, 1, 1, 0, 1, 0, 0, 1) |
| 78 | 4 | (1, 0, 0, 1, 1, 0, 0, 1) |
| 79 | 4 | (0, 1, 0, 1, 1, 0, 0, 1) |
| 80 | 4 | (0, 0, 1, 1, 1, 0, 0, 1) |
| 81 | 4 | (1, 1, 0, 0, 0, 1, 0, 1) |
| 82 | 4 | (1, 0, 1, 0, 0, 1, 0, 1) |
| 83 | 4 | (0, 1, 1, 0, 0, 1, 0, 1) |
| 84 | 4 | (1, 0, 0, 1, 0, 1, 0, 1) |
| 85 | 4 | (0, 1, 0, 1, 0, 1, 0, 1) |
| 86 | 4 | (0, 0, 1, 1, 0, 1, 0, 1) |
| 87 | 4 | (1, 0, 0, 0, 1, 1, 0, 1) |
| 88 | 4 | (0, 1, 0, 0, 1, 1, 0, 1) |
| 89 | 4 | (0, 0, 1, 0, 1, 1, 0, 1) |
| 90 | 4 | (0, 0, 0, 1, 1, 1, 0, 1) |
| 91 | 4 | (1, 1, 0, 0, 0, 0, 1, 1) |
| 92 | 4 | (1, 0, 1, 0, 0, 0, 1, 1) |
| 93 | 4 | (0, 1, 1, 0, 0, 0, 1, 1) |
| 94 | 4 | (1, 0, 0, 1, 0, 0, 1, 1) |
| 95 | 4 | (0, 1, 0, 1, 0, 0, 1, 1) |
| 96 | 4 | (0, 0, 1, 1, 0, 0, 1, 1) |
| 97 | 4 | (1, 0, 0, 0, 1, 0, 1, 1) |
| 98 | 4 | (0, 1, 0, 0, 1, 0, 1, 1) |
| 99 | 4 | (0, 0, 1, 0, 1, 0, 1, 1) |
| 100 | 4 | (0, 0, 0, 1, 1, 0, 1, 1) |
| 101 | 4 | (1, 0, 0, 0, 0, 1, 1, 1) |
| 102 | 4 | (0, 1, 0, 0, 0, 1, 1, 1) |
| 103 | 4 | (0, 0, 1, 0, 0, 1, 1, 1) |
| 104 | 4 | (0, 0, 0, 1, 0, 1, 1, 1) |
| 105 | 4 | (0, 0, 0, 0, 1, 1, 1, 1) |
| 106 | 8 | (1, 1, 1, 1, 1, 1, 1, 1) |
| 107-127 | RESERVED | RESERVED BITS |

$I_{TRP}$ may be an index of the time resource pattern, $k_{TRP}$ may indicate the number of subframes through which data is transmitted, $(b'_0, b'_1, \ldots, b'_{N_{TRP}-1})$ may indicate the time resource pattern parameter, and $N_{TRP}$ may indicate the number of subframes included in a subframe set. Tables 3 to 5 may indicate the time resource pattern parameter when $N_{TRP}$ is 8.

The reserved bit corresponding to $I_{TRP}$ 107 to 127 among the time resource pattern parameters described in Tables 3 to 5 may indicate the number of repeated transmissions, and the number of repeated transmissions may be configured to various values. In the case that the number of repeated transmissions is preconfigured, it is not necessary to indicate additionally the number of repeated transmissions because all communication nodes belonging to the communication system (or, communication network) know the number of repeated transmissions. However, in the case that other value (e.g., new number of repeated transmissions) which is different from the preconfigured number of repeated transmissions is used, the new number of repeated transmissions may be included in the control information. In the case that the preconfigured number of repeated transmissions is 4, the new number of repeated transmissions may be a value except for 4. For example, in the case that the reserved bit is set to (0, 1, 1, 0, 1, 1, 1, 0), it may indicate that data is repeatedly transmitted in two times. In the case that the reserved bit is set to (1, 0, 1, 0, 1, 1, 1, 0), it may indicate that data is repeatedly transmitted in five times.

Tables 6 to 8 below may indicate the time resource pattern parameter when $N_{TRP}$ is 7.

TABLE 6

| $I_{TRP}$ | $k_{TRP}$ | $(b_0', b_1', \ldots b'_{N_{TRP}-1})$ |
|---|---|---|
| 0 | RESERVED | RESERVED BITS |
| 1 | 1 | (1, 0, 0, 0, 0, 0, 0) |
| 2 | 1 | (0, 1, 0, 0, 0, 0, 0) |
| 3 | 2 | (1, 1, 0, 0, 0, 0, 0) |
| 4 | 1 | (0, 0, 1, 0, 0, 0, 0) |
| 5 | 2 | (1, 0, 1, 0, 0, 0, 0) |
| 6 | 2 | (0, 1, 1, 0, 0, 0, 0) |
| 7 | 3 | (1, 1, 1, 0, 0, 0, 0) |
| 8 | 1 | (0, 0, 0, 1, 0, 0, 0) |
| 9 | 2 | (1, 0, 0, 1, 0, 0, 0) |
| 10 | 2 | (0, 1, 0, 1, 0, 0, 0) |
| 11 | 3 | (1, 1, 0, 1, 0, 0, 0) |
| 12 | 2 | (0, 0, 1, 1, 0, 0, 0) |
| 13 | 3 | (1, 0, 1, 1, 0, 0, 0) |
| 14 | 3 | (0, 1, 1, 1, 0, 0, 0) |
| 15 | 4 | (1, 1, 1, 1, 0, 0, 0) |
| 16 | 1 | (0, 0, 0, 0, 1, 0, 0) |
| 17 | 2 | (1, 0, 0, 0, 1, 0, 0) |
| 18 | 2 | (0, 1, 0, 0, 1, 0, 0) |
| 19 | 3 | (1, 1, 0, 0, 1, 0, 0) |
| 20 | 2 | (0, 0, 1, 0, 1, 0, 0) |
| 21 | 3 | (1, 0, 1, 0, 1, 0, 0) |
| 22 | 3 | (0, 1, 1, 0, 1, 0, 0) |
| 23 | 4 | (1, 1, 1, 0, 1, 0, 0) |
| 24 | 2 | (0, 0, 0, 1, 1, 0, 0) |
| 25 | 3 | (1, 0, 0, 1, 1, 0, 0) |
| 26 | 3 | (0, 1, 0, 1, 1, 0, 0) |
| 27 | 4 | (1, 1, 0, 1, 1, 0, 0) |
| 28 | 3 | (0, 0, 1, 1, 1, 0, 0) |
| 29 | 4 | (1, 0, 1, 1, 1, 0, 0) |
| 30 | 4 | (0, 1, 1, 1, 1, 0, 0) |
| 31 | 5 | (1, 1, 1, 1, 1, 0, 0) |
| 32 | 1 | (0, 0, 0, 0, 0, 1, 0) |
| 33 | 2 | (1, 0, 0, 0, 0, 1, 0) |
| 34 | 2 | (0, 1, 0, 0, 0, 1, 0) |
| 35 | 3 | (1, 1, 0, 0, 0, 1, 0) |
| 36 | 2 | (0, 0, 1, 0, 0, 1, 0) |
| 37 | 3 | (1, 0, 1, 0, 0, 1, 0) |
| 38 | 3 | (0, 1, 1, 0, 0, 1, 0) |

TABLE 6-continued

| $I_{TRP}$ | $k_{TRP}$ | $(b_0', b_1', \ldots b'_{N_{TRP}-1})$ |
|---|---|---|
| 39 | 4 | (1, 1, 1, 0, 0, 1, 0) |
| 40 | 2 | (0, 0, 0, 1, 0, 1, 0) |
| 41 | 3 | (1, 0, 0, 1, 0, 1, 0) |
| 42 | 3 | (0, 1, 0, 1, 0, 1, 0) |
| 43 | 4 | (1, 1, 0, 1, 0, 1, 0) |

TABLE 7

| $I_{TRP}$ | $k_{TRP}$ | $(b_0', b_1', \ldots b'_{N_{TRP}-1})$ |
|---|---|---|
| 44 | 3 | (0, 0, 1, 1, 0, 1, 0) |
| 45 | 4 | (1, 0, 1, 1, 0, 1, 0) |
| 46 | 4 | (0, 1, 1, 1, 0, 1, 0) |
| 47 | 5 | (1, 1, 1, 1, 0, 1, 0) |
| 48 | 2 | (0, 0, 0, 0, 1, 1, 0) |
| 49 | 3 | (1, 0, 0, 0, 1, 1, 0) |
| 50 | 3 | (0, 1, 0, 0, 1, 1, 0) |
| 51 | 4 | (1, 1, 0, 0, 1, 1, 0) |
| 52 | 3 | (0, 0, 1, 0, 1, 1, 0) |
| 53 | 4 | (1, 0, 1, 0, 1, 1, 0) |
| 54 | 4 | (0, 1, 1, 0, 1, 1, 0) |
| 55 | 5 | (1, 1, 1, 0, 1, 1, 0) |
| 56 | 3 | (0, 0, 0, 1, 1, 1, 0) |
| 57 | 4 | (1, 0, 0, 1, 1, 1, 0) |
| 58 | 4 | (0, 1, 0, 1, 1, 1, 0) |
| 59 | 5 | (1, 1, 0, 1, 1, 1, 0) |
| 60 | 4 | (0, 0, 1, 1, 1, 1, 0) |
| 61 | 5 | (1, 0, 1, 1, 1, 1, 0) |
| 62 | 5 | (0, 1, 1, 1, 1, 1, 0) |
| 63 | 6 | (1, 1, 1, 1, 1, 1, 0) |
| 64 | 1 | (0, 0, 0, 0, 0, 0, 1) |
| 65 | 2 | (1, 0, 0, 0, 0, 0, 1) |
| 66 | 2 | (0, 1, 0, 0, 0, 0, 1) |
| 67 | 3 | (1, 1, 0, 0, 0, 0, 1) |
| 68 | 2 | (0, 0, 1, 0, 0, 0, 1) |
| 69 | 3 | (1, 0, 1, 0, 0, 0, 1) |
| 70 | 3 | (0, 1, 1, 0, 0, 0, 1) |
| 71 | 4 | (1, 1, 1, 0, 0, 0, 1) |
| 72 | 2 | (0, 0, 0, 1, 0, 0, 1) |
| 73 | 3 | (1, 0, 0, 1, 0, 0, 1) |
| 74 | 3 | (0, 1, 0, 1, 0, 0, 1) |
| 75 | 4 | (1, 1, 0, 1, 0, 0, 1) |
| 76 | 3 | (0, 0, 1, 1, 0, 0, 1) |
| 77 | 4 | (1, 0, 1, 1, 0, 0, 1) |
| 78 | 4 | (0, 1, 1, 1, 0, 0, 1) |
| 79 | 5 | (1, 1, 1, 1, 0, 0, 1) |
| 80 | 2 | (0, 0, 0, 0, 1, 0, 1) |
| 81 | 3 | (1, 0, 0, 0, 1, 0, 1) |
| 82 | 3 | (0, 1, 0, 0, 1, 0, 1) |
| 83 | 4 | (1, 1, 0, 0, 1, 0, 1) |
| 84 | 3 | (0, 0, 1, 0, 1, 0, 1) |
| 85 | 4 | (1, 0, 1, 0, 1, 0, 1) |
| 86 | 4 | (0, 1, 1, 0, 1, 0, 1) |
| 87 | 5 | (1, 1, 1, 0, 1, 0, 1) |

TABLE 8

| $I_{TRP}$ | $k_{TRP}$ | $(b_0', b_1', \ldots b'_{N_{TRP}-1})$ |
|---|---|---|
| 88 | 3 | (0, 0, 0, 1, 1, 0, 1) |
| 89 | 4 | (1, 0, 0, 1, 1, 0, 1) |
| 90 | 4 | (0, 1, 0, 1, 1, 0, 1) |
| 91 | 5 | (1, 1, 0, 1, 1, 0, 1) |
| 92 | 4 | (0, 0, 1, 1, 1, 0, 1) |
| 93 | 5 | (1, 0, 1, 1, 1, 0, 1) |
| 94 | 5 | (0, 1, 1, 1, 1, 0, 1) |
| 95 | 6 | (1, 1, 1, 1, 1, 0, 1) |
| 96 | 2 | (0, 0, 0, 0, 0, 1, 1) |
| 97 | 3 | (1, 0, 0, 0, 0, 1, 1) |
| 98 | 3 | (0, 1, 0, 0, 0, 1, 1) |
| 99 | 4 | (1, 1, 0, 0, 0, 1, 1) |
| 100 | 3 | (0, 0, 1, 0, 0, 1, 1) |
| 101 | 4 | (1, 0, 1, 0, 0, 1, 1) |

TABLE 8-continued

| $I_{TRP}$ | $k_{TRP}$ | $(b_0', b_1', \ldots b'_{N_{TRP}-1})$ |
|---|---|---|
| 102 | 4 | (0, 1, 1, 0, 0, 1, 1) |
| 103 | 5 | (1, 1, 1, 0, 0, 1, 1) |
| 104 | 3 | (0, 0, 0, 1, 0, 1, 1) |
| 105 | 4 | (1, 0, 0, 1, 0, 1, 1) |
| 106 | 4 | (0, 1, 0, 1, 0, 1, 1) |
| 107 | 5 | (1, 1, 0, 1, 0, 1, 1) |
| 108 | 4 | (0, 0, 1, 1, 0, 1, 1) |
| 109 | 5 | (1, 0, 1, 1, 0, 1, 1) |
| 110 | 5 | (0, 1, 1, 1, 0, 1, 1) |
| 111 | 6 | (1, 1, 1, 1, 0, 1, 1) |
| 112 | 3 | (0, 0, 0, 0, 1, 1, 1) |
| 113 | 4 | (1, 0, 0, 0, 1, 1, 1) |
| 114 | 4 | (0, 1, 0, 0, 1, 1, 1) |
| 115 | 5 | (1, 1, 0, 0, 1, 1, 1) |
| 116 | 4 | (0, 0, 1, 0, 1, 1, 1) |
| 117 | 5 | (1, 0, 1, 0, 1, 1, 1) |
| 118 | 5 | (0, 1, 1, 0, 1, 1, 1) |
| 119 | 6 | (1, 1, 1, 0, 1, 1, 1) |
| 120 | 4 | (0, 0, 0, 1, 1, 1, 1) |
| 121 | 5 | (1, 0, 0, 1, 1, 1, 1) |
| 122 | 5 | (0, 1, 0, 1, 1, 1, 1) |
| 123 | 6 | (1, 1, 0, 1, 1, 1, 1) |
| 124 | 5 | (0, 0, 1, 1, 1, 1, 1) |
| 125 | 6 | (1, 0, 1, 1, 1, 1, 1) |
| 126 | 6 | (0, 1, 1, 1, 1, 1, 1) |
| 127 | 7 | (1, 1, 1, 1, 1, 1, 1) |

The reserved bit corresponding to $I_{TRP}$ 0 among the time resource pattern parameters described in Tables 6 to 8 may indicate the number of repeated transmissions. The time resource pattern parameter corresponding to preconfigure n number of $I_{TRP}$ among $I_{TRP}$ 1 to 127 may indicate the number of repeated transmissions, and the number of repeated transmissions may be configured as various values. In the case that the number of repeated transmissions is preconfigured, it is not necessary to indicate additionally the number of repeated transmissions because all communication nodes belonging to the communication system (or, communication network) know the number of repeated transmissions. However, in the case that other value (e.g., new number of repeated transmissions) which is different from the preconfigured number of repeated transmissions is used, the new number of repeated transmissions may be included in the control information. In the case that the preconfigured number of repeated transmissions is 4, the new number of repeated transmissions may be a value except for 4.

Tables 9 and 10 below may indicate the time resource pattern parameter when $N_{TRP}$ is 6.

TABLE 9

| $I_{TRP}$ | $k_{TRP}$ | $(b_0', b_1', \ldots b'_{N_{TRP}-1})$ |
|---|---|---|
| 0 | RESERVED | RESERVED BITS |
| 1 | 1 | (1, 0, 0, 0, 0, 0) |
| 2 | 1 | (0, 1, 0, 0, 0, 0) |
| 3 | 2 | (1, 1, 0, 0, 0, 0) |
| 4 | 1 | (0, 0, 1, 0, 0, 0) |
| 5 | 2 | (1, 0, 1, 0, 0, 0) |
| 6 | 2 | (0, 1, 1, 0, 0, 0) |
| 7 | 3 | (1, 1, 1, 0, 0, 0) |
| 8 | 1 | (0, 0, 0, 1, 0, 0) |
| 9 | 2 | (1, 0, 0, 1, 0, 0) |
| 10 | 2 | (0, 1, 0, 1, 0, 0) |
| 11 | 3 | (1, 1, 0, 1, 0, 0) |
| 12 | 2 | (0, 0, 1, 1, 0, 0) |
| 13 | 3 | (1, 0, 1, 1, 0, 0) |
| 14 | 3 | (0, 1, 1, 1, 0, 0) |
| 15 | 4 | (1, 1, 1, 1, 0, 0) |
| 16 | 1 | (0, 0, 0, 0, 1, 0) |

TABLE 9-continued

| $I_{TRP}$ | $k_{TRP}$ | $(b_0', b_1', \ldots b'_{N_{TRP}-1})$ |
|---|---|---|
| 17 | 2 | (1, 0, 0, 0, 1, 0) |
| 18 | 2 | (0, 1, 0, 0, 1, 0) |
| 19 | 3 | (1, 1, 0, 0, 1, 0) |
| 20 | 2 | (0, 0, 1, 0, 1, 0) |
| 21 | 3 | (1, 0, 1, 0, 1, 0) |
| 22 | 3 | (0, 1, 1, 0, 1, 0) |
| 23 | 4 | (1, 1, 1, 0, 1, 0) |
| 24 | 2 | (0, 0, 0, 1, 1, 0) |
| 25 | 3 | (1, 0, 0, 1, 1, 0) |
| 26 | 3 | (0, 1, 0, 1, 1, 0) |
| 27 | 4 | (1, 1, 0, 1, 1, 0) |
| 28 | 3 | (0, 0, 1, 1, 1, 0) |
| 29 | 4 | (1, 0, 1, 1, 1, 0) |
| 30 | 4 | (0, 1, 1, 1, 1, 0) |
| 31 | 5 | (1, 1, 1, 1, 1, 0) |
| 32 | 1 | (0, 0, 0, 0, 0, 1) |
| 33 | 2 | (1, 0, 0, 0, 0, 1) |

TABLE 10

| $I_{TRP}$ | $k_{TRP}$ | $(b_0', b_1', \ldots b'_{N_{TRP}-1})$ |
|---|---|---|
| 34 | 2 | (0, 1, 0, 0, 0, 1) |
| 35 | 3 | (1, 1, 0, 0, 0, 1) |
| 36 | 2 | (0, 0, 1, 0, 0, 1) |
| 37 | 3 | (1, 0, 1, 0, 0, 1) |
| 38 | 3 | (0, 1, 1, 0, 0, 1) |
| 39 | 4 | (1, 1, 1, 0, 0, 1) |
| 40 | 2 | (0, 0, 0, 1, 0, 1) |
| 41 | 3 | (1, 0, 0, 1, 0, 1) |
| 42 | 3 | (0, 1, 0, 1, 0, 1) |
| 43 | 4 | (1, 1, 0, 1, 0, 1) |
| 44 | 3 | (0, 0, 1, 1, 0, 1) |
| 45 | 4 | (1, 0, 1, 1, 0, 1) |
| 46 | 4 | (0, 1, 1, 1, 0, 1) |
| 47 | 5 | (1, 1, 1, 1, 0, 1) |
| 48 | 2 | (0, 0, 0, 0, 1, 1) |
| 49 | 3 | (1, 0, 0, 0, 1, 1) |
| 50 | 3 | (0, 1, 0, 0, 1, 1) |
| 51 | 4 | (1, 1, 0, 0, 1, 1) |
| 52 | 3 | (0, 0, 1, 0, 1, 1) |
| 53 | 4 | (1, 0, 1, 0, 1, 1) |
| 54 | 4 | (0, 1, 1, 0, 1, 1) |
| 55 | 5 | (1, 1, 1, 0, 1, 1) |
| 56 | 3 | (0, 0, 0, 1, 1, 1) |
| 57 | 4 | (1, 0, 0, 1, 1, 1) |
| 58 | 4 | (0, 1, 0, 1, 1, 1) |
| 59 | 5 | (1, 1, 0, 1, 1, 1) |
| 60 | 4 | (0, 0, 1, 1, 1, 1) |
| 61 | 5 | (1, 0, 1, 1, 1, 1) |
| 62 | 5 | (0, 1, 1, 1, 1, 1) |
| 63 | 6 | (1, 1, 1, 1, 1, 1) |
| 64-127 | RESERVED | RESERVED BITS |

The reserved bit corresponding to $I_{TRP}$ 0 among the time resource pattern parameters described in Tables 9 and 10 may indicate the number of repeated transmissions. The reserved bit corresponding to $I_{TRP}$ 64 to 127 among the time resource pattern parameter described in Tables 9 and 10 may indicate the number of repeated transmissions, and the number of repeated transmissions may be configured as various values. In the case that the number of repeated transmissions is preconfigured, it is not necessary to indicate additionally the number of repeated transmissions because all communication nodes belonging to the communication system (or, communication network) know the number of repeated transmissions. However, in the case that other value (e.g., new number of repeated transmissions) which is different from the preconfigured number of repeated transmissions is used, the new number of repeated transmissions may be included in the control information. In the case that the preconfigured number of repeated transmissions is 4, the new number of repeated transmissions may be a value except for 4.

Figure 5:
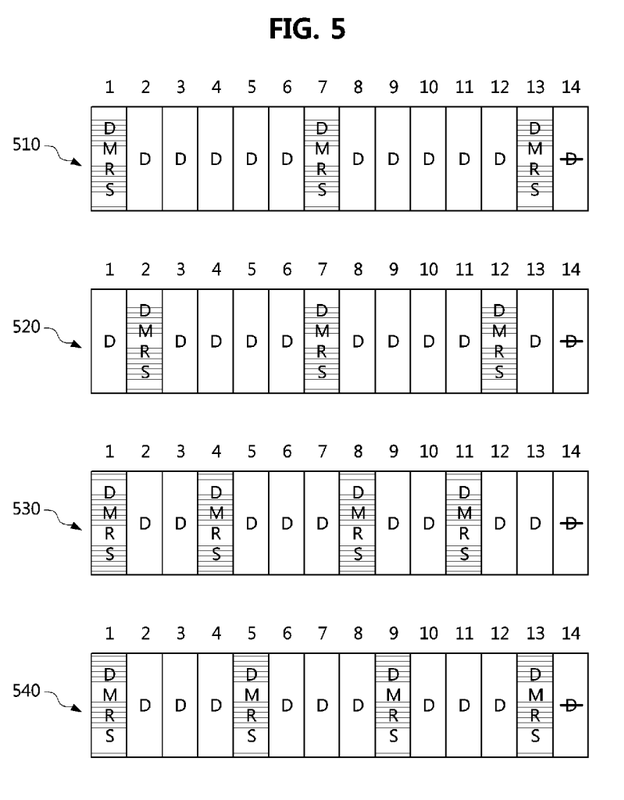
FIG. 5 is a conceptual diagram showing reference signal pattern.

Meanwhile, the reference signal pattern may be as follows.

FIG. 5 is a conceptual diagram showing reference signal pattern.

As shown in FIG. 5, according to a reference signal pattern1 510, the reference signal may be transmitted through 1st, 7th, and 13th symbols in a subframe, and data may be transmitted through remaining symbols. According to a reference signal pattern2 520, the reference signal may be transmitted through 2nd, 7th, and 12th symbols in a subframe, and data may be transmitted through remaining symbols. According to a reference signal pattern3 530, the reference signal may be transmitted through 1st, 4th, 8th, and 11th symbols in a subframe, and data may be transmitted through remaining symbols. According to a reference signal pattern4 540, the reference signal may be transmitted through 1st, 5th, 9th, and 13th symbols in a subframe, and data may be transmitted through remaining symbols.

As re-shown in FIG. 3, the base station may configure the number of repeated transmissions in consideration of requirement of respective services, network environment, environment of an area in which the first UE and the second UE are located, movement speed (or, average movement speed) of the first UE and the second UE, recovery rate of data (e.g., reception success probability of data), density of UE, and so on. For example, in the case that channel state between the first UE and the second UE is good, the base station may configure the number of repeated transmissions as a relative low value (e.g., value (i.e., 1, 2, 3) less than 4). On the other hand, in the case that channel state between the first UE and the second UE is bad, the base station may configure the number of repeated transmissions as a relative high value (e.g., value (i.e., 5, 6, 7, 8) more than 4).

In addition, in the case that the density of UE is equal to or less than a predefined threshold, the base station may configure the number of repeated transmissions as a relative low value (e.g., value (i.e., 1, 2, 3) less than 4). On the other hand, in the case that the density of UE is more than the predefined threshold, the base station may configure the number of repeated transmissions as a relative high value (e.g., value (i.e., 5, 6, 7, 8) more than 4).

In addition, in the case that the movement speed (or, average movement speed) of UE is equal to or less than a predefined threshold, the base station may configure the number of repeated transmissions as a relative low value (e.g., value (i.e., 1, 2, 3) less than 4). On the other hand, in the case that the movement speed (or, average movement speed) of UE is more than the predefined threshold, the base station may configure the number of repeated transmissions as a relative high value (e.g., value (i.e., 5, 6, 7, 8) more than 4).

The base station may configure the redundancy version parameter based on the parameter on the number of repeated transmissions. Rate matching based on a redundancy version indicated by the redundancy version parameter may be applied to data which is transmitted from the first UE to the second UE. In the case that the parameter on the number of repeated transmissions indicates 2, the redundancy version parameter may be set to "0, 2." In the case that the parameter on the number of repeated transmissions indicates 4, the redundancy version parameter may be set to "0, 2, 3, 1." In the case that the parameter on the number of repeated transmissions indicates 6, the redundancy version parameter may be set to "0, 2, 3, 1, 0, 2" or "0, 2, 3, 1, 2, 3."

Alternatively, the redundancy version parameter may be set to all zero regardless of the number of repeated transmissions.

The redundancy version parameter may not be limited to the foregoing description and may be configured in various ways. Meanwhile, in the case that the first UE and the second UE may know preconfigure redundancy version, the base station may not configure the redundancy version parameter. Therefore, the first UE and the second UE may use the preconfigured redundancy version.

The base station may configure the reference signal pattern parameter in consideration of the requirement of respective services, the network environment, the environment of the area in which the first UE and the second UE are located, the movement speed (or, average movement speed) of the first UE and the second UE, the recovery rate of data (e.g., reception success probability of data), the density of UE, and so on. Here, the reference signal may be a demodulation reference signal (DMRS), a channel state information-reference signal (CSI-RS), a sounding reference signal (SRS), a cell-specific reference signal (CRS), and so on.

Each of the first UE and the second UE may transmit necessary control information for transmitting and receiving data and the parameter (e.g., the number of repeated transmissions, reference signal pattern, modulation and coding (MCS), etc.) configured by the base station. Here, the parameter configured by the base station may be included in the control information.

Meanwhile, the base station may configure allowable range (e.g., maximum value, minimum value, etc.) of necessary parameter (e.g., the number of repeated transmissions, reference signal pattern, MCS, etc.) for transmitting and receiving data. The base station may periodically transmit common control information including the allowable range information to UEs (e.g., UEs belonging to coverage of the base station) in a broadcast manner. In addition, in the case that the environment of the area in which UE is located, the movement speed of UE, the recovery rate of data, the density of UE, and so on are obtained from UEs, the base station may update the allowable range based on the information obtained from the UEs and transmit the updated allowable range information. The UE may obtain the allowable range information from the base station and configure corresponding parameter (e.g., the number of repeated transmissions, reference signal pattern, MCS, etc.) in the allowable range. For example, the UE may configure the corresponding parameter (e.g., the number of repeated transmissions, reference signal pattern, MCS, etc.) in the allowable range based on the requirement of respective services, the network environment, the location of UE, the movement speed of UE, the recovery rate of data, the density of UE, and so on.

In a first case that the necessary parameter (e.g., the number of repeated transmissions, reference signal pattern, MCS, etc.) for transmitting and receiving data is preconfigured, a second case that the UE is located out of coverage of the base station (or, access point, RRH, RSU, etc.), or a third case that the base station does not provide the necessary parameter (e.g., the number of repeated transmissions, reference signal pattern, MCS, etc.) for transmitting and receiving data, the UE may configure corresponding parameter (e.g., the number of repeated transmissions, reference signal pattern, MCS, etc.) in consideration of the requirement of respective services, the network environment, the location of UE, the movement speed of UE, the recovery rate of data, the density of UE, and so on. For example, in the case that data to be transmitted from the UE is data with high reliability, the UE may configure the number of repeated transmissions as a relative high value (e.g., value (i.e., 5, 6, 7, 8) more than 4) and apply high MCS. In the case that data to be transmitted from the UE is data which requires low delay time of service, the UE may configure the number of repeated transmissions as a relative low value (e.g., value (i.e., 1, 2, 3) less than 4).

In addition, in the case that the recovery rate of data (e.g., reception success probability of data) is equal to or less than a predefined threshold, the UE may configure the number of repeated transmissions as a relative low value (e.g., value (i.e., 1, 2, 3) less than 4). On the other hand, in the case that the recovery rate of data (e.g., reception success probability of data) is more than the predefined threshold, the UE may configure the number of repeated transmissions as a relative high value (e.g., value (i.e., 5, 6, 7, 8) more than 4).

In addition, in the case that the movement speed (or, average movement speed) of the UE is equal to or less than a predefined threshold, the UE may configure the number of repeated transmissions as a relative low value (e.g., value (i.e., 1, 2, 3) less than 4). On the other hand, in the case that the movement speed (or, average movement speed) of the UE is more than the predefined threshold, the UE may configure the number of repeated transmissions as a relative high value (e.g., value (i.e., 5, 6, 7, 8) more than 4).

Meanwhile, the base station may transmit at least one parameter among parameters described in Table 1 based on a common control signaling (i.e., broadcast) or a dedicated control signaling (S310). For example, the base station may transmit system information block (SIB) type 18 or downlink control information (DCI) format 5 including the parameters. The SIB type 18 or DCI format 5 may basically include the resource parameter for PSCCH, the transmission power control (TPC) command parameter for PSCCH and PSSCH, the frequency hopping flag parameter, the $N_{UL\_hop}$ parameter, the hopping resource allocation parameter, the resource block allocation parameter, and the time resource pattern parameter and further include at least one of the parameter on the number of repeated transmissions, the redundancy version parameter, and the reference signal pattern parameter. Here, the SIB type 18 may be a message used for transmitting system information in the D2D communications or the vehicle communications. The DCI format 5 may be a message used for transmitting downlink control information in the D2D communications or the vehicle communications.

The first UE may receive the SIB type 18 or the DCI format 5 from the base station and obtain the parameters described in Table 1 from the SIB type 18 or the DCI format 5. The first UE may generate control information including at least one parameter described in Table 11 below based on the parameters obtained from the SIB type 18 or the DCI format 5 (S320).

TABLE 11

| PARAMETER | LENGTH | COMMENT |
|---|---|---|
| Group destination identifier | 8 bits | Identifying whether data which will be transmitted to receiving UE exists based on group destination identifier. |
| MCS | 5 bit | Indicating modulation and coding rate which are applied to data transmission. |
| Frequency hopping flag | 1 bit | Indicating whether frequency hopping is applied. |
| $N_{UL\_hop}$ | 1 bit (1.4 MHz), 1 bit (3 MHz), 1 bit (5 MHz), 2 bits (10 MHz), 2 bits (15 MHz), 2 bits (20 MHz) | Indicating the number of uplink hops. |
| Hopping resource allocation | 5 bits (1.4 MHz), 7 bits (3 MHz), 7 bits (5 MHz), 11 bits (10 MHz), 12 bits (15 MHz), 13 bits (20 MHz) | Resource information (frequency domain) of PSSCH. |
| Resource block allocation | | Resource information (frequency domain) of PSSCH. |
| Time resource pattern | 7 bits | Resource information (time domain) of PSSCH. |
| TA | 11 bits | Indicating TA. |
| Number of repeated transmissions | | Indicating the number of repeated transmissions of data. |
| Redundancy version | | Indicating redundancy version of data which is repeatedly transmitted. |
| Reference signal pattern | | Indicating transmission pattern of reference signal. |

The group destination identifier parameter, the MCS parameter, and the timing advance (TA) parameter described in Table 11 may be configured by the first UE. Each of the frequency hopping flag parameter, the $N_{UL\_hop}$ parameter, the hopping resource allocation parameter, the resource block allocation parameter, the time resource pattern parameter, the parameter on the number of repeated transmissions, the redundancy version parameter, and the reference signal pattern parameter described in Table 11 may be identical to corresponding parameter (i.e., corresponding parameter obtained from the SIB type 18 or the DCI format 5) described in Table 1. However, the parameter on the number of repeated transmissions may be configured based on a base station to which the second UE belongs. For example, in the case that a base station to which the first UE belongs is identical to a base station to which the second UE belongs, the parameter on the number of repeated transmissions described in Table 11 may be configured to be identical to the parameter on the number of repeated transmissions described in Table 1. On the other hand, in the case that a base station to which the first UE belongs is different from a base station to which the second UE belongs, the parameter on the number of repeated transmissions described in Table 11 may be set according to the parameter on the number of repeated transmissions, as message transmitted from a base station to which each UE belongs, described in Table 1.

The control information may basically include the group destination identifier parameter, the MCS parameter, the frequency hopping flag parameter, the $N_{UL\_hop}$ parameter, the hopping resource allocation parameter, the resource block allocation parameter, the time resource pattern parameter, and the TA parameter and further include the parameter on the number of repeated transmissions, the redundancy version parameter, and the reference signal pattern parameter. For example, in the case that the number of repeated transmissions is indicated by the time resource pattern parameter (e.g., the number of repeated transmissions is indicated by the reserved bit described in Tables 3 to 10), the control information may not include the parameter on the number of repeated transmissions.

The first UE may transmit sidelink control information (SCI) format 0 including the control information (S330). The SCI format 0 may be transmitted through resource (i.e., PSCCH) indicated by the resource parameter for PSCCH using power based on the TPC command parameter for PSCCH and PSSCH. The SCI format 0 may be transmitted through two subframes. For example, the SCI format 0 may be repeatedly transmitted in two times. Here, the SCI format 0 may be a message including control information for the D2D communications or a message including control information for the vehicle communications. Meanwhile, in the case that the second UE is located in cell coverage of the base station, the second UE may obtain the D2D communication related parameter (or, vehicle communication related parameter) by receiving the SIB type 18 or the DCI format 5 from the base station. In this case, therefore, step S330 may be omitted.

The second UE may receive the SCI format 0 from the first UE through PSCCH and identify the control information by decoding the received SCI format 0 (i.e., decoding the control information) (S340). The second UE may identify whether data which will be transmitted to the second UE exists based on the group destination identifier parameter included in the control information. For example, in the case that an identifier indicated by the group destination identifier parameter is identical to an identifier of the second UE, the second UE may determine that data which will be transmitted to the second UE exists. On the other hand, in the case that an identifier indicated by the group destination identifier parameter is different from an identifier of the second UE, the second UE may determine that data which will be transmitted to the second UE does not exist. In this case, the second UE may not receive a signal which is transmitted through PSSCH.

In the case that an identifier indicated by the group destination identifier parameter is identical to an identifier of the second UE, the second UE may identify a modulation and a coding rate which are applied to data transmission based on the MCS parameter included in the control information. In addition, the second UE may identify frequency resource, to which PSSCH is allocated, based on the hopping resource allocation parameter and the resource block allocation parameter included in the control information and identify time resource, to which PSSCH is allocated, based on the time resource pattern parameter included in the control information. However, in the case that the second UE know already time to which PSSCH is allocated, the time resource pattern parameter may indicate the number of repeated transmissions of data.

In addition, the second UE may identify a TA value based on the TA parameter included in the control information. In addition, in the case that the reference signal pattern parameter is included in the control information, the second UE may determine that the reference signal is transmitted based on the reference signal pattern parameter. In the case that the time resource pattern parameter indicates the time resource pattern and the parameter on the number of repeated transmissions is not included in the control information, the second UE may determine that data is repeatedly transmitted based on preconfigured redundancy version in four times. In the case that the parameter on the number of repeated transmissions is included in the control information, the second UE may determine that data is repeatedly transmitted as much as number indicated by the parameter on the number of repeated transmissions. In this case, when the redundancy version parameter is included in the control information, the second UE may determine that data is transmitted based on a redundancy version indicated by the redundancy version parameter. On the other hand, when the redundancy version parameter is not included in the control information, the second UE may determine that data is transmitted based on a preconfigured redundancy version.

Meanwhile, the first UE may transmit data to the second UE through PSSCH (S350). The first UE may transmit the data based on the control information. For example, the data to which the modulation and the coding rate indicated by the MCS parameter are applied may be transmitted and the data may be transmitted using power based on the TPC command parameter for PSCCH and PSSCH. In addition, the data may be transmitted through frequency resource indicated by the hopping resource allocation parameter and the resource block allocation parameter and time resource indicated by the time resource pattern parameter. In addition, the data may be repeatedly transmitted based on number indicated by the parameter on the number of repeated transmissions, and the data to be repeatedly transmitted may be data based on the redundancy version indicated by the redundancy version parameter. In the case that the parameter on the number of repeated transmissions and the redundancy version parameter are not included in the control information, the data may be repeatedly transmitted basically in four times. For example, the data may be transmitted through four subframes. In addition, the first UE may transmit the reference signal based on the reference signal pattern parameter included in the control information. The reference signal may be transmitted in the PSSCH period.

Meanwhile, an interval between a transmission (or, reception) time of last control information among control information transmitted in the PSCCH period and a transmission (or, reception) time of initial data among data transmitted in the PSSCH period (e.g., interval between a reception end time of the last control information and a reception start time of the initial data) may be configured to be equal to or more than time duration necessary for decoding the last control information. Therefore, the second UE may identify necessary control information for receiving the initial data prior to reception of the initial data among data transmitted in the PSSCH period and receive the initial data based on the identified control information. In addition, the second UE may receive data which is repeatedly transmitted through the PSSCH period and decode the received data based on the redundancy version. In addition, the second UE may receive the reference signal through resource indicated by the reference signal pattern. Here, the second UE may receive the data, the reference signal, and so on based on the control information received from the first UE or the D2D communication related parameter received from the base station.

Figure 6:
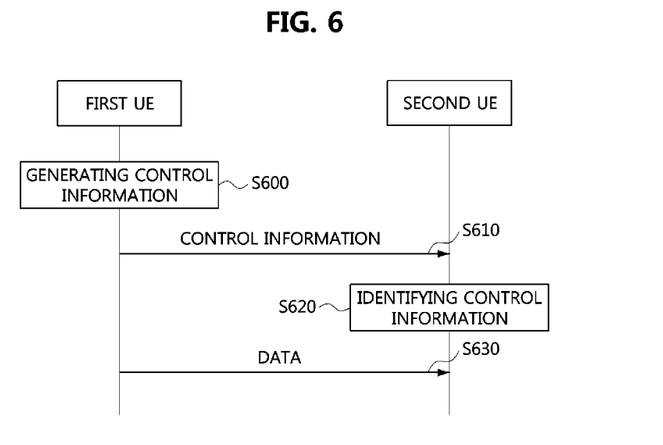
FIG. 6 is a sequence chart showing a D2D communication method (or, vehicle communication method) based on a mode 2.

The D2D communications (or, vehicle communications) based on the mode 2 may be performed as follows.

FIG. 6 is a sequence chart showing a D2D communication method (or, vehicle communication method) based on a mode 2.

As shown in FIG. 6, a first UE and a second UE may be located in or out of cell coverage of a base station. The first UE may be a transmitting UE which transmits data in the D2D communications (or, vehicle communications), and the second UE may be a receiving UE which receives data in the D2D communications (or, vehicle communications). Each of the first UE and the second UE may have elements identical or similar to the communication node 200 shown in FIG. 2.

In the case that the first UE wishes to transmit data based on the D2D communications (or, vehicle communications), the first UE may generate necessary control information for data transmission (S600). The control information may include at least one parameter described in Table 11, and the parameter described in Table 11 may be configured by the first UE. For example, the first UE may configure the time resource pattern parameter to satisfy Equation 1. The first UE may transmit SCI format 0 including the control information through PSCCH (S610). The SCI format 0 may be transmitted through two subframes. For example, the SCI format 0 may be repeatedly transmitted in two times.

The second UE may receive the SCI format 0 from the first UE through PSCCH and identify the control information by decoding the received SCI format 0 (i.e., decoding the control information) (S620). The second UE may identify whether data which will be transmitted to the second UE exists based on the group destination identifier parameter included in the control information. For example, in the case that an identifier indicated by the group destination identifier parameter is identical to an identifier of the second UE, the second UE may determine that data which will be transmitted to the second UE exists. On the other hand, in the case that an identifier indicated by the group destination identifier parameter is different from an identifier of the second UE, the second UE may determine that data which will be transmitted to the second UE does not exist. In this case, the second UE may not receive a signal which is transmitted through PSSCH.

In the case that an identifier indicated by the group destination identifier parameter is identical to an identifier of the second UE, the second UE may identify a modulation and a coding rate which are applied to data transmission based on the MCS parameter included in the control information. In addition, the second UE may identify frequency resource, to which PSSCH is allocated, based on the hopping resource allocation parameter and the resource block allocation parameter included in the control information and identify time resource, to which PSSCH is allocated, based on the time resource pattern parameter included in the control information. In addition, the second UE may identify a TA value based on the TA parameter included in the control information. In addition, in the case that the reference signal pattern parameter is included in the control information, the second UE may determine that the reference signal is transmitted based on the reference signal pattern parameter.

In the case that the time resource pattern parameter indicates the time resource pattern and the parameter on the number of repeated transmissions is not included in the control information, the second UE may determine that data is repeatedly transmitted based on a preconfigured redundancy version in four times. In the case that the parameter on the number of repeated transmissions is included in the control information, the second UE may determine that data is repeatedly transmitted as much as number indicated by the parameter on the number of repeated transmissions. In this case, when the redundancy version parameter is included in the control information, the second UE may determine that data is transmitted based on a redundancy version indicated by the redundancy version parameter. On the other hand, when the redundancy version parameter is not included in the control information, the second UE may determine that data is transmitted based on a preconfigured redundancy version.

Meanwhile, the first UE may transmit data to the second UE through PSSCH (S630). The first UE may transmit the data based on the control information. For example, the data to which the modulation and the coding rate indicated by the MCS parameter are applied may be transmitted. In addition, the data may be transmitted through frequency resource indicated by the hopping resource allocation parameter and the resource block allocation parameter and time resource indicated by the time resource pattern parameter. In addition, the data may be repeatedly transmitted based on number indicated by the parameter on the number of repeated transmissions, and the data to be repeatedly transmitted may be data based on the redundancy version indicated by the redundancy version parameter. In the case that the parameter on the number of repeated transmissions and the redundancy version parameter are not included in the control information, the data may be repeatedly transmitted basically in four times. For example, the data may be transmitted through four subframes. In addition, the first UE may transmit the reference signal based on the reference signal pattern parameter included in the control information. The reference signal may be transmitted in the PSSCH period.

Meanwhile, an interval between a transmission (or, reception) time of last control information among control information transmitted in the PSCCH period and a transmission (or, reception) time of initial data among data transmitted in the PSSCH period (e.g., interval between a reception end time of the last control information and a reception start time of the initial data) may be configure to be equal to or more than time duration necessary for decoding the last control information. Therefore, the second UE may identify necessary control information for receiving the initial data prior to reception of the initial data among data transmitted in the PSSCH period and receive the initial data based on the identified control information. In addition, the second UE may receive data which is repeatedly transmitted through the PSSCH period and decode the received data based on the redundancy version. In addition, the second UE may receive the reference signal through resource indicated by the reference signal pattern parameter.

Figure 7:
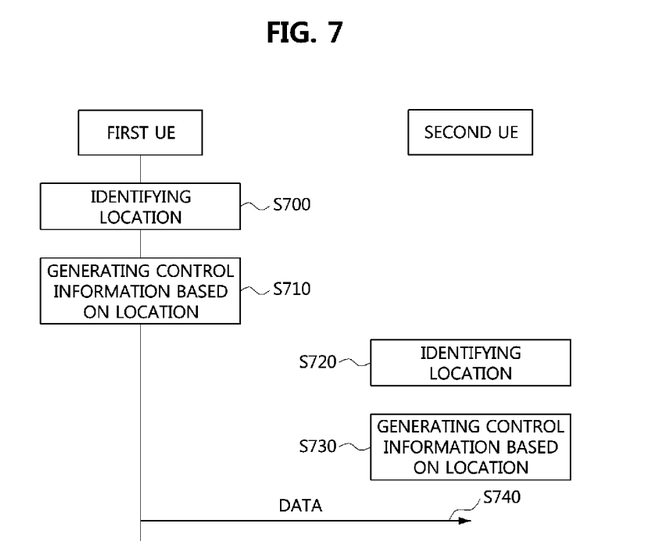
FIG. 7 is a sequence chart showing a D2D communication method (or, vehicle communication method) based on location information.

Next, a D2D communication method (or, vehicle communication method) which is performed without the foregoing procedure for transmitting and receiving the control information will be described.

FIG. 7 is a sequence chart showing a D2D communication method (or, vehicle communication method) based on location information.

As shown in FIG. 7, a first UE and a second UE may be located in or out of cell coverage of a base station. The first UE may be a transmitting UE which transmits data in the D2D communications (or, vehicle communications), and the second UE may be a receiving UE which receives data in the D2D communications (or, vehicle communications). Each of the first UE and the second UE may have elements identical or similar to the communication node 200 shown in FIG. 2.

The first UE may identify one's location based on global positioning system (GPS) or location information received from other communication node (e.g., RSU, etc.) (S700). The first UE may configure control information based on location of the first UE (S710). The control information may include at least one parameter described in Table 11. The control information corresponding to specific location may be preconfigured, and the first UE may know the preconfigured control information. For example, in the case that the first UE is located on a highway, the first UE may configure the control information (e.g., parameter on the number of repeated transmissions, redundancy version parameter, reference signal pattern parameter, etc.) corresponding to the highway.

Meanwhile, an area may be divided to a plurality of sections according to area properties. The control information of respective sections may be preconfigured according to section properties (e.g., movement speed (or, average movement speed) of UE, density of UE, etc.). The first UE may identify a section to which the first UE belongs using the location information of the first UE and identify the control information which is configured for corresponding section.

The second UE may configure, identical or similar to the first UE, control information based on location of the second UE. That is, the second UE may identify one's location based on GPS or location information received from other communication node (e.g., RSU, etc.) (S720). The second UE may configure control information based on location of the second UE (S730). The control information may include at least one parameter described in Table 11. The control information corresponding to specific location may be preconfigured, and the second UE may know the preconfigured control information. For example, in the case that the second UE is located on a highway, the second UE may configure the control information (e.g., parameter on the number of repeated transmissions, redundancy version parameter, reference signal pattern parameter, etc.) corresponding to the highway.

Meanwhile, in the case that the first UE is located in boundary of section (e.g., first section), the first UE may transmit the control information to the second UE so that the second UE belonging to other section (e.g., second section) receives successfully data.

Here, it is described that the operations (i.e., S720, S730) of the second UE are performed after the operations (i.e., S700, S710) of the first UE, however, performing order may not be limited thereto. For example, the operations (i.e., S720, S730) of the second UE may be performed prior to the operations (i.e., S700, S710) of the first UE. Alternatively, the operations (i.e., S720, S730) of the second UE and the operations (i.e., S700, S710) of the first UE may be simultaneously performed.

In the case that the first UE wishes to transmit data, the first UE may transmit the data to the second UE based on the control information which is configured based on location (S740). The second UE may receive the data from the first UE based on the control information which is configured based on location. Here, the data may be transmitted and received through PSSCH.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first user equipment (UE) performing sidelink communications, the operation method comprising:
    receiving, from a base station, a signaling message including a modulation and coding scheme (MCS) range;
    selecting a MCS value within the MCS range indicating minimum and maximum MCS values which are used for the sidelink communications;
    generating sidelink control information (SCI) including the selected MCS value;
    transmitting the SCI to a second UE; and
    transmitting a physical sidelink shared channel (PSSCH) to the second UE using the SCI including the selected MCS value.

2. The operation method according to claim 1, wherein the minimum and maximum MCS values are determined based on an area to which the first UE belongs.

3. The operation method according to claim 1, wherein the MCS value is selected based on a speed of the first UE.

4. The operation method according to claim 1, wherein the signaling message further includes a number of repeated transmissions of the PSSCH.

5. The operation method according to claim 4, wherein the number of repeated transmissions of the PSSCH is determined based on a speed of the first UE.

6. The operation method according to claim 4, wherein the number of repeated transmissions of the PSSCH is determined within an allowable range of number of repeated transmissions of the PSSCH.

7. The operation method according to claim 4, wherein the number of repeated transmissions of the PSSCH is determined based on an area to which the first UE belongs.

8. The operation method according to claim 1, wherein information indicating a speed of the first UE is transmitted to the base station supporting the sidelink communications.

9. The operation method according to claim 1, wherein information indicating an area to which the first UE belongs is transmitted to the base station supporting the sidelink communications.

* * * * *